United States Patent

Waring

[15] 3,704,937
[45] Dec. 5, 1972

[54] OPTICAL LINE SCANNER USING A COUPLED FERROELASTIC-FERROELECTRIC CRYSTAL PLATE

[72] Inventor: Robert K. Waring, Wilmington, Del.
[73] Assignee: E. I. du Pont de Nemours and Company, Wilmington, Del.
[22] Filed: Feb. 26, 1971
[21] Appl. No.: 119,238

[52] U.S. Cl. ............ 350/162 SF, 350/150, 350/160
[51] Int. Cl. ............................ G02b 27/38, G02f 1/28
[58] Field of Search ............ 350/147, 149, 150, 157, 160–161, 350/162 SF

[56] References Cited

UNITED STATES PATENTS

| | | | |
|---|---|---|---|
| 3,397,605 | 8/1968 | Brueggemann | 350/162 SF |
| 3,308,712 | 3/1967 | Kay | 350/162 SF |
| 3,521,262 | 7/1970 | Paul | 350/151 |
| 3,602,904 | 8/1971 | Cummins | 350/150 |
| 3,559,185 | 1/1971 | Burns et al. | 350/150 |
| 3,586,415 | 6/1971 | Kumada et al. | 350/150 |

OTHER PUBLICATIONS

Soffer et al., "n Optical Imaging Method for Direct Observation and Study of Acoustic Surface Waves" APp. Phys. Lett. Vol. 15, No. 10 (Nov. 1969) pp. 339–342.

Kumada, "Domain Switching In Gdz(MoO$_4$)$_3$" Phys. Lett. Vol. 30A, No. 3, (Oct. 6, 1969) pp. 186–187.

Cummins, "Electrical, Optical, and Mechanical Behaviour of Ferroelectric Gdz(MoO " Ferroelect. Vol. 1, No. 1, (Mar, 1970) pp. 11–17.

Jacobs, "Nondestructive Readout Method" IBM Tech. Discl. Bull. Vol. 12, No. 10, (Mar. 1970) pp. 1629–1631.

*Primary Examiner*—David Schonberg
*Assistant Examiner*—Paul R. Miller
*Attorney*—D. R. J. Boyd

[57] ABSTRACT

When collimated light is passed through a coupled ferroelectric-ferroelastic crystal plate cut perpendicular to possible domain walls and divided into domains by one or more walls, the light exiting the crystal from the region of the domain wall diverges. A field lens brings the light passing through the domains to a first focus differing from the second focus of light passing through the domain wall region. By use of a suitable stop at the first focus, an image of an optical line (light on a dark field or dark on a light field) can be obtained at the second focus. The domain walls can be moved in response to electrical or mechanical stress to provide an optical line scanner. The differing polarization properties of the region of the domain wall and the adjacent domains can also be used to supplement the spatial filtering.

36 Claims, 15 Drawing Figures

PATENTED DEC 5 1972

OPTICAL LINE SCANNER USING A COUPLED FERROELASTIC-FERROELECTRIC CRYSTAL PLATE

SUMMARY OF THE INVENTION

The method of this invention is a method of optical line scanning which comprises:

i. forming at least one domain wall in a crystal plate having coupled ferroelectric-ferroelastic properties, exhibiting uniaxial electric polarization, transparent to light and cut so that the domain wall is formed perpendicular to the face of said plate;

ii. moving the domain wall in response to control signals;

iii. passing a beam of light through said plate, the plane of incidence of said beam being substantially the plane of the domain wall;

iv. focusing the light emerging from the domains to a focus;

v. separating the light passing through the domains from the light passing through the region of the domain wall by a stop at said focus; and vi. imaging the light passing said stop.

The present invention is based on the discovery that while light passing through the region of the domains of a coupled ferroelectric-ferroelastic crystal is essentially unmodified in direction, the light passing through the region of the domain wall diverges so that if a lens system is employed to focus the light passing through the domains it is brought to a focus at a point on the axis which differs from the focal point of light passing through the region of the domain. A stop at the focal point of light passing through the domains can, therefore, be employed to separate light transmitted by the domain from that transmitted by the region of the domain wall. If a pinhole aperture is employed as the stop, and the light passing the stop is imaged, a black line corresponding to the domain wall on a light field is obtained. A small opaque stop at the focus produces a light line image corresponding to the domain wall on a dark field. The domain wall can be moved in a controlled manner by electrical or mechanical means to provide an optical line scanner.

The domains of a coupled ferroelectric-ferroelastic plate are biaxially birefringent, while light transmitted by the region of the domain wall contains at least a substantial component which is unchanged in polarization. Accordingly, if polarized light is employed preferably in conjunction with a half-wave plate of the coupled ferroelectric-ferroelastic crystal plate, the light having its electric vector parallel or perpendicular to the domain wall, an analyzer can be used to isolate the light passing through the domain wall or to selectively block the same. Polarization filtering can be employed in conjunction with the spatial filtering of the present invention to enhance the transmission ratio of the light passing through the domains to that passing through the region of the domain wall in the present invention.

DETAILED DESCRIPTION OF THE INVENTION AND THE DRAWINGS

The present invention utilizes the difference in optical properties between the domains of certain ferroelectric-ferroelastic crystals and the optical properties of the region of a domain wall to generate an optical line by transmission of light, preferably collimated light together with filtering to isolate the light transmitted by the region of the domain wall from light transmitted by the adjacent domains.

A crystal is said to be ferroelectric if it exhibits a spontaneous switchable electric dipole moment. In the absence of an externally applied electric field, the electric polarization, corresponding to the dipole moment, can have two or more orientations and can be shifted from one orientation, or state, to another by the external application of an electric field.

By analogy, a crystal is said to be ferroelastic if it exhibits a spontaneous switchable mechanical strain. In the absence of an externally applied mechanical stress, the mechanical strain can have two or more configurations, and can be shifted from one configuration to another by external application of a mechanical stress. In a limited class of materials, the two effects, ferroelectricity and ferroelasticity, are coupled so that the two or more stable states of the crystal, each characterized by a definite orientation of electric polarization and a definite mechanical strain configuration, are possible.

The names "ferroelectric" and "ferroelastic" arise by analogy with ferromagnetism. Like ferromagnetic materials, ferroelectric crystals exhibit a hysteresis loop, except that the loop occurs on a plot of electric polarization versus electric field, and display a transition temperature, $T_c$, analogous to the ferromagnetic Curie temperature, above which the spontaneous dipole moment, and indeed ferroelectric behavior, disappear. Likewise, ferroelastic materials display a hysteresis loop on a plot of mechanical stress versus mechanical strain, and a transition temperature. When ferroelectricity and ferroelasticity are coupled in a single material, a hysteresis loop is displayed on a plot of electric polarization and associated mechanical strain versus electric field and associated mechanical stress, and both spontaneous polarization and spontaneous strain disappear at the same critical temperature. Such a material can be switched among states, each characterized by a specific electric polarization and mechanical strain, by external application of either an electric field or a mechanical stress, or both.

The region, within a single ferroelectric crystal, in which the spontaneous polarization vector is everywhere oriented in essentially the same direction, is called a domain. There is, generally, more than one domain within a crystal, and the interface between one or more of these domains is called a domain wall. Application of an electric field having a component in an allowed direction of polarization can cause nucleation of and/or growth of ferroelectric domains having that particular polarization direction, with consequent formation and movement of the associated domain walls. The analogous situation exists in ferroelastic material, where the domain wall is effectively a twin boundary. In coupled ferroelectric-ferroelastic materials, each ferroelectric domain is associated and coextensive with a ferroelastic domain, and the size and location of a particular domain (and thus the position and motion of a domain wall) can be controlled by either electrical or mechanical means, or by both means simultaneously.

Not all ferroelastic-ferroelectric crystals will function in the present invention. In the first place, the ferroelectric and ferroelastic phases must be coupled, and in the second place, from the point of view of information processing arrangements, the most useful crystals are those that can be constrained to exhibit planar domain walls confined to a set of planes all parallel to one axis. In order for a coupled ferroelectric-ferroelastic crystal to have such planar domain walls, the crystal must behave uniaxially; that is, the electric polarization must be constrained to lie in one direction or the other along a specific axis. In addition to this, in the most useful crystals, the planar domains walls occupy only a finite number of specific orientations within the crystal, and they must be capable of being moved in a controlled manner by external control of the electric field or mechanical stress configurations. For the purposes of this invention, therefore, the crystal used in the multistable element must be a coupled ferroelectric-ferroelastic single crystal exhibiting uniaxial electric polarization.

The most well known crystal exhibiting all of these features is $\beta'$-gadolinium molybdate. There are, however, a large number of other crystals which are useful in the present invention. Using group theoretical analysis, such as that developed and discussed by L. A. Shuvalov in his article on "Symmetry aspects of Ferroelectricity" in the Journal of the Physical Society of Japan (28 Supplement, 38, 1970) and by K. Aizu in his article on "Possible Ferroelectric and Ferroelastic Crystals and of Simultaneous Ferroelectric and Ferroelastic Crystals" in the same Journal (27, 387, 1969), the point groups associated with all crystals that are useful in the present invention, can be found.

By way of explanation, it should be noted that, in phase transitions occurring in crystalline material, the point group of the low temperature phase must generally be a subgroup of the high temperature phase. To develop coupled ferroelastic-ferroelectric properties, the high temperature phase must possess a piezoelectric coefficient that has a finite component along the axis of polarization of the low temperature phase. Furthermore, the direction of polarization of the low temperature phase must be along the equivalent directions of the high temperature phase; that is, the possible directions of polarization of the low temperature phase must be convertible, one to another, by the symmetry operations of the high temperature group. The symmetry elements of the high temperature group that are missing in the low temperature group become the "twinning" elements of the low temperature crystal. Furthermore, the number of possible domain orientations is equal to the order (number of symmetry operations) of the paraelectric point group divided by the order of the ferroelectric point group.

Since in the piezoelectric effect, the strain is an odd function of the polarization, the requirement for a finite piezoelectric coefficient along the axis of eventual polarization, mentioned above, means that, when the sign of the polarization is reversed, at least some of the mechanical lattice strains that occur because of the piezoelectric effect will also be reversed in sign. Therefore, the new Bravais lattice in the switched region of the crystal, although identical with the old Bravais lattice, cannot constitute a grid totally coincident with it without whole crystal movement. The new Bravais lattice will therefore be "non-collinear" (in the language of Shuvalov) with the old Bravais lattice, and the two lattices can, therefore, only remain joined without serious lattice distortion along certain common crystallographic planes. Furthermore, to preserve crystal continuity of a multi-domain coupled ferroelectric/ferroelastic crystal, the crystallographic axes of opposite domains must be differently oriented, which, in turn, requires whole domain motion. For example, in the case of gadolinium molybdate, the {110} planes approximately normal to a domain wall change orientation by 0.3° in the (001) plane at the domain wall. Where a domain wall is desired but does not exist, therefore, one can be produced by applying an external stress to the crystal to deform the crystal in the manner attendant upon the presence of the desired wall. Conversely, when two walls of different allowed orientation intersect, the necessary whole domain deformation associated with one wall interfers with that of the other wall, and large, potentially destructive, strains develop. This can be avoided, however, if the whole crystal motion necessarily attendant on the formation of walls having one of the allowed orientations is inhibited by externally applied mechanical means, in which case, formation of walls having this particular orientation is inhibited and the potentially destructive strain associated with the intersection of this wall with another perpendicular wall never develops.

For purposes of the following discussion the term coupled ferroelectric-ferroelastic crystals exhibiting uniaxial electric polarization will be considered to be identical with the term ferroelectric-ferroelastic crystal exhibiting uniaxial electric polarization and having domains with non-collinear Bravais lattices. Both terms will include all the crystals in the following Aizu point groups: $\overline{4}2mFmm2$, $\overline{4}F2$, $222F2$, $\overline{4}2mF2$, $422F2$, $622F2$, $\overline{4}3mFmm2$ and $23F2$. By definition the terms will also refer and be limited to these crystals in their ferroelectric state, i.e., in the state below their respective transition temperature. The preferred crystals come from the following uniaxial point groups: $\overline{4}2mFmm2$, $\overline{4}F2$ and $22F2$. A partial list of crystals known to exhibit a symmetry change that falls within the indicated Aizu point group is given in Table I.

TABLE I $\overline{4}2mFmm2$
   $Gd_2(MoO_4)_3$
   $KH_2PO_4$
$222F2$
   $NaKC_4H_4O_6 \cdot 4H_2O$
   $RbH_3(SeO_3)_2$
$23F2$
   $(NH_4)_2Cd_2(SO_4)_3$
   $NH_3(CH_3)Al(SO_4)_2 \cdot 12H_2O$
$\overline{4}3mFmm2$
   $M_3B_7O_{13}X$
   wherein M is a cationic constituent, usually divalent, e.g., Mg and X is an anionic constituent, e.g., a halogen atom (but only when the structure indicated falls within the symmetry group $\overline{4}3mFmm2$).

The most well known crystals displaying coupled ferroelectric/ferroelastic behavior are crystals having the gadolinium molybdate structure falling into the class represented by the formula $(R_xR'_{1-x})_2O_3 \cdot 3Mo_{1-c}W_cO_3$ wherein R and R' represent scandium, yttrium or a rare earth element having an atomic number of from 57 to 71, x is from 0 to 1.0, and e is from 0 to 0.2. These crystals are described more fully in U.S. Pat. No. 3,437,432, issued to H. J. Borchardt on Apr. 8, 1969, and assigned to the assignee of the present invention. More specifically, it is the ferroelectric/ferroelastic phase, commonly referred to as the $\beta'$ phase of these gadolinium molybdate type materials, that exhibit coupled ferroelectric/ferroelastic behavior. Insofar as is necessary for a proper description of the present invention, the disclosure of both of these references is hereby incorporated into this specification. Crystals having the $\beta'$-gadolinium molybdate structure fall into the Aizu group $\overline{4}2mFmm2$. These materials display two orientations of domain walls which are normal to both two-fold rotation axes of the paraelectric group, $\overline{4}2m$. The electric polarization vector lies along the four-fold rotary inversion axis of the paraelectric phase in one or the other of the equivalent directions parallel thereto. These two directions are equivalent because they are interconverted by the two-fold rotation operations. Accordingly, these operations are lost as symmetry elements in going through the transition to the mm2 ferroelectric phase; and they become the "twinning" operations that interconvert the ferroelectric-ferroelastic domains.

A number of the crystals described by Borchardt, specifically $\beta'$-DyGd(MoO$_4$)$_3$, $\beta'$-Nd$_{0.2}$Tb$_{1.98}$(MoO$_4$)$_3$, $\beta'$-Gd$_2$(M$_{0.90}$W$_{0.10}$O$_4$)$_3$, $\beta'$-SmGd(MoO$_4$)$_3$ and those crystals represented by the formula $\beta'$-X$_2$(MoO$_4$)$_3$, where X can be Nd, Sm, Eu, Gd or Tb, display planar domain walls that occupy {110} lattice planes. For the purpose of this invention this means that they can be treated as identical with $\beta'$-gadolinium molybdate.

Furthermore, from a macroscopic point of view, there are two types of domain nucleation that occur in $\beta'$-gadolinium molybdate type structure. In one, which will be referred to as Type A, a domain wall extending from one edge of the crystal to another is formed. This type of nucleation occurs only along the edges of the crystal, and occurs most easily at narrow parts of the crystal where the distance between the two edges spanned by the domain wall is small, or, more specifically, where the area of the domain wall at the point of formation is small. It is characterized, on a macroscopic scale, by the fact that a single domain wall is formed which moves through the crystal as the domain grows from one edge of the crystal to the other. In the second type of domain nucleation, which will be referred to as Type B, two parallel domain walls of opposite sign are formed at one edge of the crystal and join at a point within the crystal. Because of the large elastic strain associated with any non planarity of the walls very little wall bending occurs, and, therefore, in rare earth molybdates such as $\beta'$-gadolinium molybdates Type B domains assume a thin blade-like shape with almost, but not quite, planar walls. These domains nucleate at one edge of the crystal and, as they grow, the intersection of the two walls moves across the crystal until it reaches a second edge at which point the walls separate and move in opposite directions. This domain, therefore, is characterized on the macroscopic scale, by the fact that two parallel domain walls are formed which move in opposite directions as the domain grows. On a microscopic scale, it may be that Type A nucleation is merely a species of Type B nucleation, occuring at a microscopic projection on an otherwise perfectly cut plane. One of the walls thus formed moves into the bulk of the crystal and is observed as the single domain wall of Type B nucleation while the other exits the crystal.

The transition from one domain to another domain having a non-collinear Bravais lattice is not abrupt, but rather takes place in a continuous manner over a finite region of the crystal called the domain wall. The optical properties likewise vary continuously across the domain wall. With respect to the polarization properties, adjacent domains are optically birefringent. When light polarized with its electric vector parallel to or perpendicular to the plane of the domain wall is collimated and passed through a coupled ferroelectric-ferroelastic crystal divided into two domains, the light will be elliptically polarized to the same degree in the two domains, but in the opposite sense. Over the domain wall, however, the light transmitted contains a substantial component at least having its electric vector unchanged. The amount of such component may vary from point to point across the wall, however, when appropriately distinguished by an analyzer a line of small but finite width can be observed. For $\beta'$-gadolinium molybdate the observed line has a width of about 5 microns. For the purpose of this invention it can be taken that over a small finite region, light is transmitted unchanged in polarization. This region may not be wholly coextensive with the domain wall as determined by the distortion of lattice parameters and will be referred to as the region of the domain wall.

It has also been found that, in addition to the differing polarization properties, the light emerging from the region of the domain wall is not collinear with the incident light but appears to diverge.

The ferroelastic properties of the crystal tend to maintain highly planar domain walls extending completely across the crystal. For $\beta'$-gadolinium molybdate the region of the domain wall observed optically has been found to be linear to at least one part in 10,000, the accuracy of measurement. Thus the difference in optical properties in transmission of a plate of coupled ferroelectric-ferroelastic material cut perpendicular to a domain wall can be utilized to provide an optical line with appropriate filtering.

Domain walls can be generated and moved in coupled ferroelectric-ferroelastic crystals in response to electrical and/or mechanical stress. Accordingly, by passing a beam of light through a plate of a coupled ferroelectric-ferroelastic crystal, filtering the light to distinguish between light transmitted by the region of the domain wall and the adjacent domain and with the provision of means to move the domain wall in response to control signals there is provided a useful optical line scanner.

This invention will be better understood by reference to the drawings which accompany this specification. In the drawings.

THE GENERATION AND CONTROL OF DOMAIN WALLS

A domain wall strongly tends to assume a planar configuration. The wall can be moved in a plate cut perpendicular thereto by the application of an electric field to the surfaces of the plate, the direction of movement depending on the polarity of the field. The wall moves as a whole even though the electric field is applied to only a portion of the crystal surrounding the wall. This property enables shaped electrodes to be employed to promote nucleation of domain walls in a preferred direction and to provide controlled movement of domain walls. Crystal shaping techniques can also be used to promote nucleation in a preferred direction. Mechanical clamping prevents the conversion of one state of the crystal to the other state and thus provides a technique for inhibiting wall movement.

The nucleation and control of domain walls is described more fully in the copending commonly assigned application of John R. Barkley, Ser. No. 112,733 filed Feb. 4, 1971.

Figure 1:
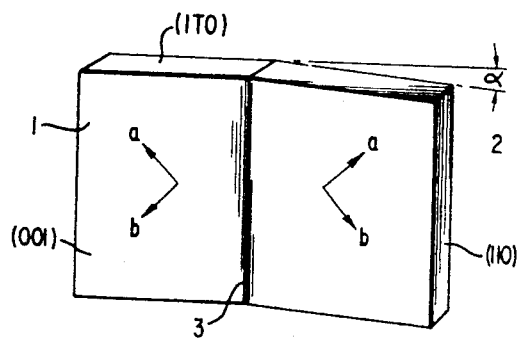
FIG. 1 illustrates the formation of two domains separated by a domain wall in a c-cut plate of a crystal having the $\beta'$-gadolinium molybdate structure.

Referring to the drawings, FIG. 1 shows a crystal plate of a coupled ferroelectric-ferroelastic crystal having the $\beta'$-gadolinium molybdate structure which is divided into two domains by a domain wall. In such materials the c-axis of the orthorhombic unit cell is an axis of uniaxial electric polarization and domain walls form on the {110} set of planes the intersection of such planes containing the c-axis. In FIG. 1 the plate is cut with its faces perpendicular to the c-axis, i.e., along the (001) planes, so that the domain walls are formed perpendicular to the faces of the plate, hereinafter referred to as a c-cut plate. The edges of the plate are cut parallel to possible domain walls, i.e., along the {110} planes. In FIG. 1 the plate is shown divided into two domains 1 and 2 respectively separated by a domain wall 3 oriented in the [110] direction. In domain 2, the a and b crystal axes of the orthorhombic unit cell are interchanged with respect to those of domain 1 as indicated in the figure. The transition from one domain to another is accompanied by the change of shape evidencing the change of spontaneous strain, in this case a simple shear deformation about the c-axis having an angle, a, which for $\beta'$-gadolinium molybdate is about 0.3°.

Figure 2:
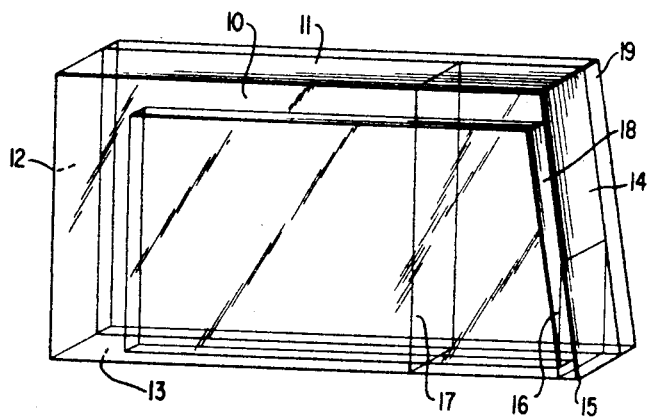
FIG. 2 illustrates the shaping and electroding of a coupled ferroelectric-ferroelastic plate to promote nucleation of domain walls in a preferred direction.

Nucleation of domains along an edge of a crystal plate can be inhibited by reducing the electric field applied along that edge. In addition, cutting or cleaving the crystal accurately along the direction of possible domains is also beneficial, particularly if a domain wall intersecting that edge already exists and is retained within the crystal. Domains can be preferentially nucleated along the edge of a crystal plate which has been cut at a small angle to a possible domain direction if an electric field is applied at that edge. The method of cutting the edges of a crystal plate and electroding the faces of the plate to achieve nucleation of a wall of predetermined orientation is shown in FIG. 2. In FIG. 2 a plate composed of a coupled ferroelectric-ferroelastic crystal, 10, such as a c-cut plate of a crystal having the $\beta'$-gadolinium molybdate structure is shown. Edges 11, 12 and 13 are cut or cleaved parallel to possible domain wall planes (in the case of the $\beta'$-gadolinium molybdate structure, the (110) and the (1$\bar{1}$0) planes. Edge 14 is cut at about a 10° angle to edge 12. This angle is not, however, highly critical. Electrodes 18 and 19 are deposited on the faces of the plate. These electrodes should be sufficiently thin so that movement of the plate is not inhibited, and where the optical transmission of the plate is to be utilized, as in the present invention, should be of a transparent conducting material such as tin oxide. On application of an electric voltage between electrodes 18 and 19 a domain wall is generated originating at area 15 where edges 13 and 14 intersect. Domain walls in the crystal plate are indicated by 16 and 17. Once a wall has been formed it is difficult to remove it at edge 14. As mentioned above the presence of domain walls such as 16 and 17 inhibits the nucleation of domain walls at edges 11 and 13 and movement of such walls away from those edges. The magnitude of the voltage needed to cause such nucleation will depend on a number of factors including the thickness of the crystal and the type of crystal used, since each crystal has its own threshold field for domain nucleation. In general and electric field of at least 100 volts/cm., preferably 500 volts/cm. is necessary to nucleate and move a domain. Specifically, for a typical quarter-wave plate crystal of gadolinium molybdate (0.37 mm. at 5,500A.) a voltage of 50 volts applied across the crystal has been found to be sufficient to nucleate and move domain walls across the crystal. The selection of the voltage applied to the electrodes is within the skill of one normally skilled in the art, the only criterion being that the voltage used to nucleate and/or propagate the domain should be below the breakdown voltage of the crystal.

Figure 3:
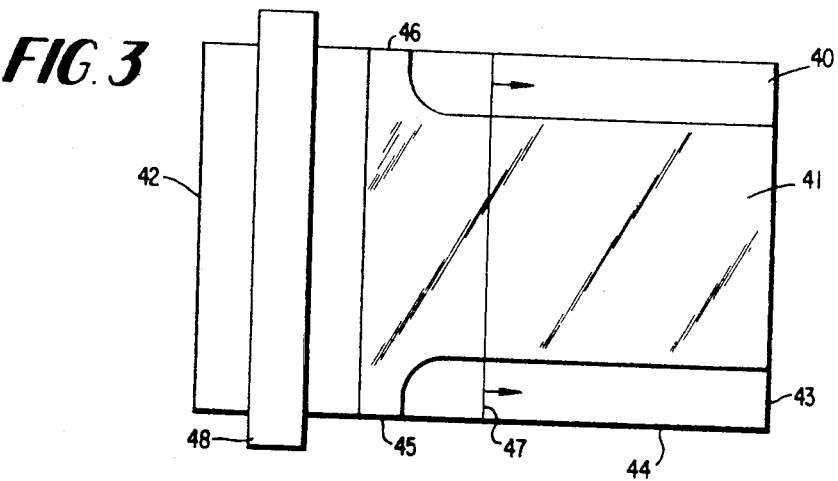
FIG. 3 illustrates a method employing shaped electrodes to nucleate domain walls in a preferred direction in a coupled ferroelectric-ferroelastic crystal plate.

FIG. 3 illustrates another method of initiating domains in a preferred direction in a coupled ferroelectric-ferroelastic crystal plate having its edges 41, 42, 43 and 44 cut parallel to possible domain wall directions. The bottom of the plate is completely covered with a transparent electrode (not shown), the top of the plate is partially covered with a T-shaped transparent electrode, in which the arms of the T extend to opposite edges 41 and 44, the base of the T extending to edge 43. The application of a voltage to the T shaped electrode will cause a type B domain to nucleate in the region 45–46 when the arms of the T extend across the plate. One domain wall will move towards the top of the T, adjacent arms 45 and 46 and stop at the edge of the electrode. The other domain wall will move towards edge 43, and if that edge is cut parallel to the domain wall will exit the crystal plate. Applying a second pulse of reverse polarity to the electrode will, rather than nucleate a new domain, move the domain wall stored at the edge of the electrode nearest edge 42 towards edge 43 and out of the crystal. A third pulse will start the procedure, from the nucleation of a new domain between 45 and 46, over again. This configuration then will produce a stream of domain walls moving from 45–46 to edge 43 where voltage pulses of alternate polarity are applied to the electrodes. Since the electrode is displaced from those edges of the plate, except at points 45 and 46 where nucleation is desired, spurious nucleation is inhibited. To further ensure that spurious nucleation will not occur, a mechanical clamp 48 can be applied to the face of the plate at the end adjacent the arms of the T shaped electrode.

Figure 4:
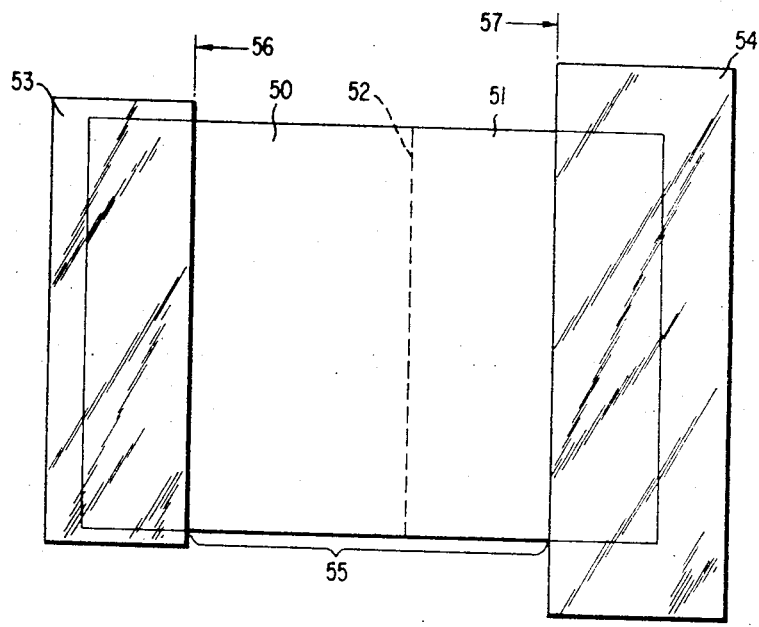
FIG. 4 illustrates a method of trapping a domain wall in a coupled ferroelectric-ferroelastic crystal plate by mechanical constraint.

A domain wall in a plate of a c-cut crystal of gadolinium molybdate can be trapped and retained within a predetermined area by mechanically preventing movement of adjacent areas. A method of achieving this is shown in FIG. 4. In that figure, a plate of a coupled ferroelectric-ferroelastic crystal has its edges cut parallel to possible domain walls is divided into two domains 50 and 51 by a domain wall 52 which can be generated as described above. A rigid sheet 53 such as a glass plate is firmly cemented along one edge of the plate with the edge 56 of the rigid sheet parallel to the domain wall. The immobilization of the crystal thus prohibits switching of any part of the crystal plate under the sheet out of the original condition of the domain 50. A second rigid sheet 54 is cemented with its edge 57 parallel to the domain wall on the other end of the gadolinium molybdate plate, thereby permanently retaining the section of the plate thus immobilized in the configuration of domain 51. The wall 52 can travel in the range 55 between the edges of the two rigid plates but cannot be moved out of the crystal. The wall is thus stored and movement restricted to a predetermined range. While this storage process has been described with respect to a single wall, any odd number of walls can be injected before clamping.

Figure 5:
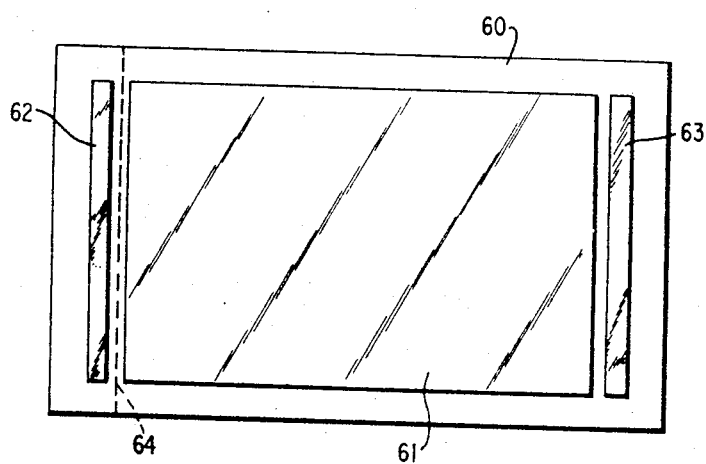
FIG. 5 illustrates a method of trapping a domain wall in a predetermined region of a coupled ferroelectric-ferroelastic crystal plate by an electrical method.
Figure 6:
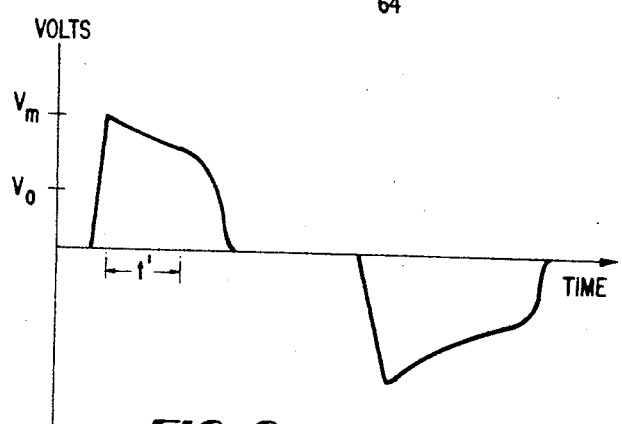
FIG. 6 illustrates the voltage wave form employed to control domain wall motion in the electroded crystal plate of FIG. 5.

Domains can also be confined to move in a predetermined region of a coupled ferroelectric-ferroelastic crystal plate by electrical methods as illustrated in FIG. 5. In that figure, a coupled ferroelectric-ferroelastic crystal plate 60 having its edges cut parallel to the plane of possible domains is fully electroded on one face (not shown in FIG. 5). The opposing face shown in the drawing has a rectangular electrode 61 covering the central portion of the plate and spaced from each of the edges. If a voltage, exceeding the threshold value required to move the domain wall, is applied between electrode 61 and the electrode covering the opposite face while a domain wall is under electrode 61, the domain wall will move to the right or the left depending on the polarity of the applied voltage until it passes beyond the edge of electrode 61 to a point in the crystal where the electric field decreases below the threshold field. The domain wall is thus stored adjacent to the edge of the electrode. The domain wall can be recalled under the electrode and moved adjacent to the opposite edge of the electrode by application of a reverse voltage to electrode 61. This voltage must be greater than that initially applied since it is necessary for the field to exceed the threshold field at the storage location of the wall. In order to store the wall at the edges of the electrode 61 and to sweep the domain wall across the field defined by electrode 61 repetitiously, a shaped voltage pulse such as that shown in FIG. 6 can be employed, the voltage ranging to a maximum at the leading edge of the pulse to recall the wall under electrode 61 and decreasing to a value which is lower, but above the threshold potential for the reminder of the pulse, the pulse duration being sufficient to drive the wall from one storage location to the opposite storage location. The voltage at the trailing edge of the pulse should be reduced to a level insufficient to drive the wall unretrievably into the zero field zone. An alternative method of recalling the domain wall from a storage location to the field of the driving electrode 61 without employing a shaped voltage pulse is to employ a pair of auxiliary electrodes 62 and 63 of FIG. 5 which are spaced from the electrode 61. The gap between the auxiliary electrode and the principal electrode provides storage for a domain wall. A domain wall stored between electrode 61 and 62 is indicated by 64 in the figure. The wall is recalled under 61 by application of a potential to electrodes 61 and 62 simultaneously and moved by the field produced by the voltage on electrode 61 to the second storage location between electrodes 61 and 63. In this instance not potential is applied to electrode 63. For the reverse cycle, potential is applied to electrodes 61 and 63 and not to electrode 62.

Figure 7:
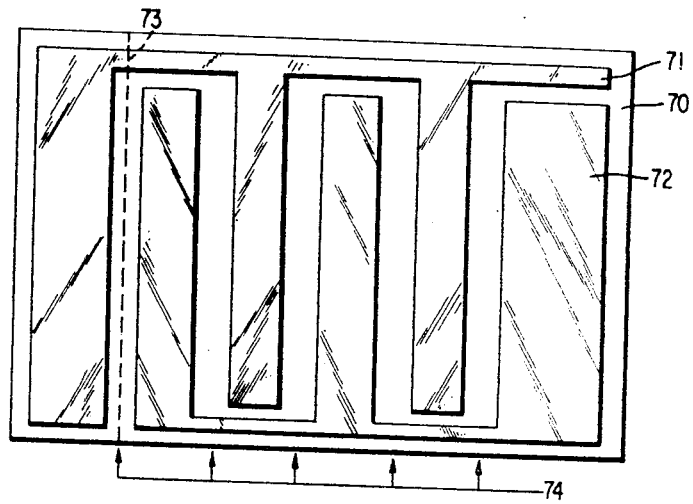
FIG. 7 illustrates the electroding of a crystal plate of a coupled ferroelectric-ferroelastic material to move a domain wall to a predetermined sequence of discrete locations.

The technique of wall storage described in connection with FIG. 5 can be extended to provide an incremental wall movement across the crystal plate through a sequence of storage locations. FIG. 7 shows an electrode configuration for accomplishing this result. In the figure, a plate cut from a coupled ferroelectric-ferroelastic crystal plate, 70, having its edges parallel to the plane of possible domain walls has two electrodes 71 and 72, deposited on one face thereof in the form of two combs, the bars forming the "teeth" of the combs being interlaced and spaced from each other as shown in FIG. 7. The opposite face of the plate 70 (not shown) is either fully electroded or electroded as shown in FIG. 5 to retain a domain wall such as 73 within the crystal plate. The sequence of gaps, 74, between electrodes 71 and 72 provide a sequence of five storage locations for the domain wall, domain wall 73 being located in the first of these storage locations. The voltage V of the electrode covering the opposing face (61 if the electrode configuration of FIG. 5 is employed) in conjunction with electrodes 71 and 72 provides the motive force to move the wall. The polarity of the voltage V applied to this electrode determines the direction of wall motion. A voltage (less than V) is applied to electrode 71 and an equal voltage of opposite sign is applied to electrode 72. The force on a wall located beneath electrodes 71 and 72 is proportional to the difference between V and the and the voltage applied to electrode 71 or 72 respectively. With the polarity of V set, reversing the polarity of the voltage applied to 71 and 72 will cause the domain wall to pass successively from one storage location to the next. Reversing the polarity of V will cause the domain wall to move in the opposite direction.

Figure 8:
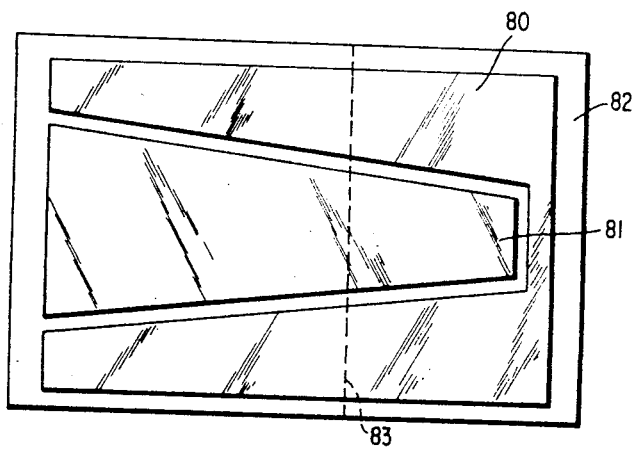
FIG. 8 illustrates a method of electroding a coupled ferroelectric-ferroelastic crystal plate to enable positioning the domain wall continuously in a predetermined manner across the plate.

FIG. 8 shows a method by which a domain wall can be placed in a continuously variable location. In FIG. 8 interdigited wedge shaped electrodes 80 and 81 are positioned on the surface of a coupled ferroelectric-ferroelastic plate, the other surface of which is fully electroded. A single wedge shaped electrode would suffice, so long as the net driving force exerted on the wall by the electric field is a monotonically increasing function of the distance along an axis parallel to the direction of motion of the domain wall, but two wedge shaped electrodes provide more positive control. In the embodiment shown in FIG. 8, the force exerted on the wall, 83, causing it to move is the sum of two forces; one proportional to the product of the length of the wall under electrode 81 times the voltage applied to electrode 81, the other proportional to the product of the length of the wall under electrode 80 times the voltage applied to electrode 80. By varying the magnitude and sign of the voltage applied to each electrode, the wall can be moved to any position within the switching region where the net driving force drops below the threshold force for domain wall motion.

THE OPTICAL SCANNER

Figures 9, 10:
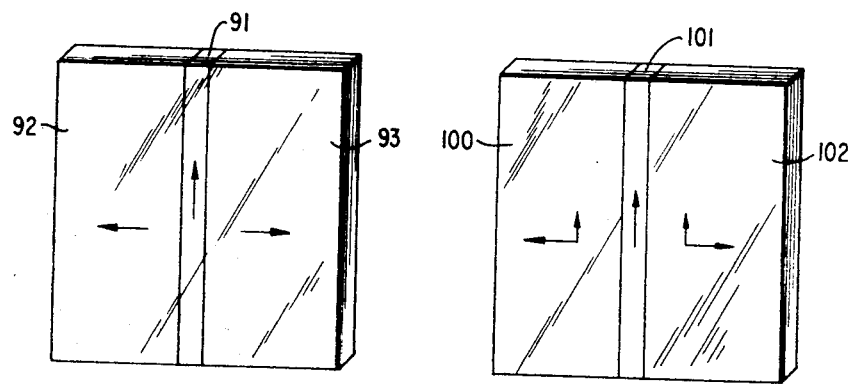
FIG. 9 illustrates the change in polarization of polarized light or transmission through a half-wave plate of a coupled ferroelectric-ferroelastic crystal.
FIG. 10 illustrates the change in polarization of polarized light on transmission through a coupled ferroelectric-ferroelastic crystal plate of arbitrary thickness.

The differing optical properties of a domain wall and the adjacent optical domain are utilized in the present invention to form an optical scanning device. Referring now to FIG. 9, there is shown in plane view a *c*-cut crystal of gadolinium molybdate 90. The domain wall is indicated by the area 91 in this figure dividing domains 92 and 93. (The thickness of the domain wall is greatly exaggerated in this figure.) The crystal is cut so that the biaxially birefringent domains 92 and 93 are each half-wave plates. In FIG. 9 the arrows in regions 91, 92 and 93 show the directions of polarization of a beam of light, collimated along the *c*-axis of the plate and polarized in the plane of the domain wall, after being modified by passing through the plate. Light passing through the region of the domain wall acts as if it is unchanged in polarization, while the light emerging from the domains is plane polarized at right angles to the domain wall. By placing an analyzer in the path of the emerging light oriented to pass light polarized in the same sense as the incident light, the light emerging from the domain wall is transmitted but the light from both surrounding domains is extinguished. Thus a light line corresponding to the domain wall is produced on a dark field. This line can be moved across the field in a predetermined manner by moving the domain wall as described hereinabove. For gadolinium molybdate, the width of the line thus produced is about 5 $\mu$.

If the analyzer is set to extinguish light passing through the domain wall, a dark line corresponding to the domain wall is observed on a light field.

FIG. 10 shows the state of polarization light initially polarized in the plane of the domain wall and incident along the *c*-axis after passing through the domains and domain wall of a *c*-cut plate of gadolinium molybdate cut to an arbitrary thickness. In the figure, the gadolinium molybdate plate is divided into two domains 100 and 102 by a domain wall 101. The state of polarization of the emerging light is indicated by vectors in the area representing each domain 100 and 102 and in the area 101 representing the domain wall. If an analyzer is placed in the path of the emergent beam and oriented to extinguish light passing through the domain wall, the components of the elliptically polarized light passing through the adjacent domains which are in the plane of polarization of the analyzer will be transmitted by the analyzer so that a dark line in a light field is observed (i.e., the light passing through the domains is partially but not completely extinguished).

The laser forms an ideal source of light for use with the optical scanner of the present invention, since laser light sources are monochromatic, highly collimated, often polarized and can provide high intensity illumination. The laser can be a continuous or a pulsed laser depending on the application of the optical scanner.

Other sources of illumination, including white light sources which can be adequately collimated, can also be used.

Figure 11:
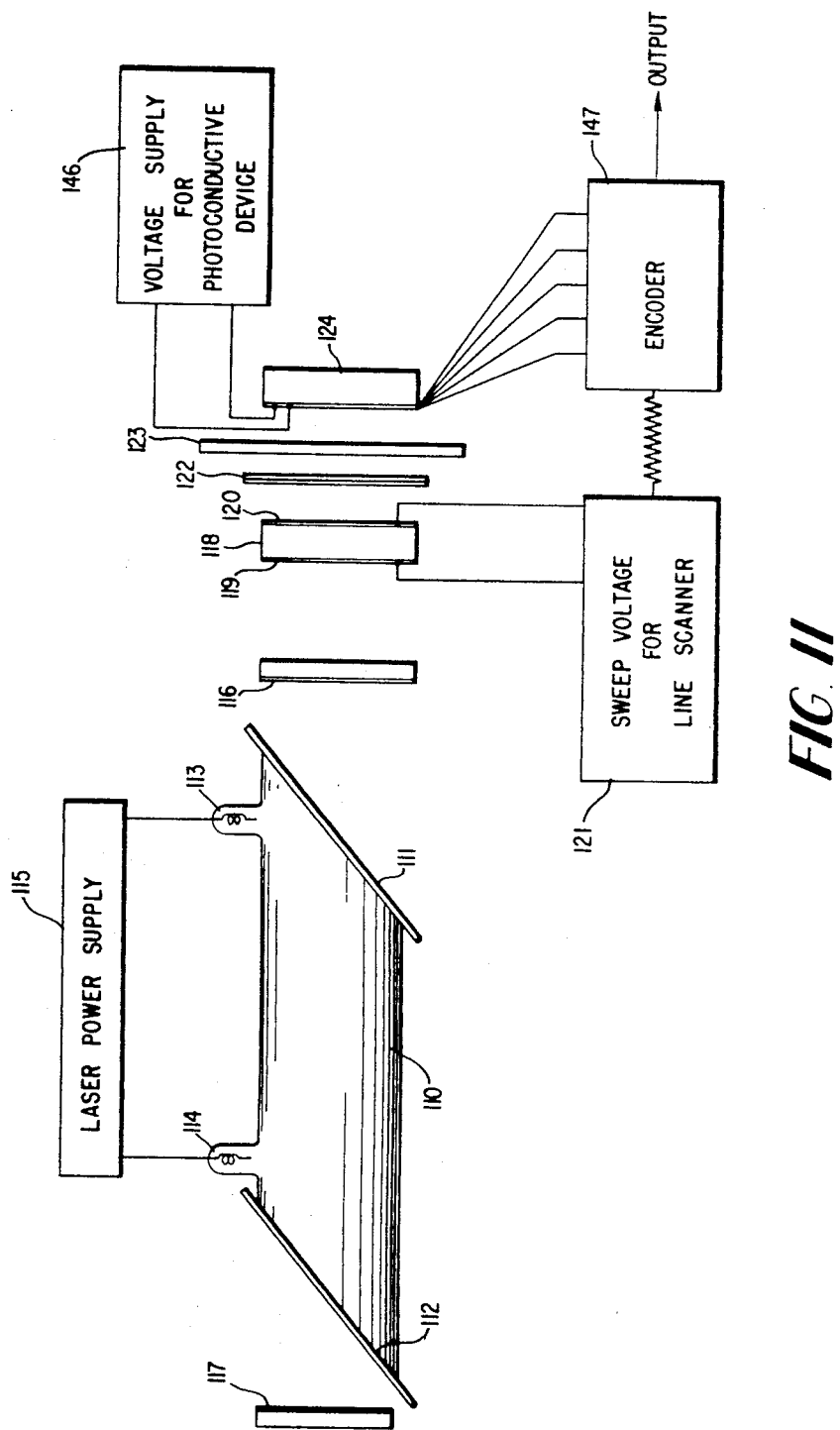
FIG. 11 illustrates the construction of an optical line scanner according to the present invention and its use in converting an image on a photographic transparency to electrical signals.

A simple application using such an optical scanner is employed to convert a pattern recorded on a photographic transparency to electronic signals is shown in FIG. 11. In FIG. 11, a helium-neon laser is employed as a continuous light source. The helium-neon gas mixture is contained in a glass tube fitted with windows 111, 112 at the Brewster angle so that the light emerging from the tube is plane polarized. The tube is fitted with electrodes 113 and 114 and supplied with power by a power supply 115. Mirrors 116 and 117 form an optical resonant cavity, mirror 116 being partially reflective, so that a beam of collimated, plane polarized, coherent light passes through mirror 116. The beam of polarized coherent light next passes through a gadolinium molybdate crystal 118 which is cut with broad faces perpendicular to the *c*-axis of the rhombohedral unit cell, and has a thickness of about 0.8 mm sufficient to produce $\lambda/2$ phase difference between the ordinary and the extraordinary rays passing through the birefringent domain of the crystal. The crystal plate is also cut so that its edges are {110} planes. The plate is mounted by cementing it along a (110) edge to a suitable support so that the free end of the crystal opposite the cemented edge can move. One face of the crystal is fully electroded with a transparent electrode 119 such as tin oxide. The other face is also electroded with a tin oxide electrode having a configuration as shown in FIG. 3. A power supply 121 supplies a square wave potential to electrode 120 with respect to electrode 119 (which can conveniently be at ground potential). With each reversal of potential, a new domain wall is swept across the plate. The voltage (generally between 200 and 1,000 V.) across the electrodes is maintained while each domain wall sweeps across the crystal at a rate determined by the product of the electric field and the length of a wall exposed thereto.

The light from the laser passes through the part of the crystal swept by one domain wall, and the period of the square wave is adjusted so that the wall moves out of the crystal before the next domain wall starts to transverse the plate. After passing through the gadolinium molybdate crystal, the light passes through an analyzer 122 which can be a sheet material, such as that sold under the trade name Polaroid, placed in close proximity to the crystal, but not clamped thereto in such a way as to hinder the movement of the crystal. The analyzer is oriented to pass unchanged polarized light from the laser 110, so that a slit shaped divergent beam of light emerges from the polarizer which has passed through the domain wall. The line of light is swept across the aperture of the device with the passage of each domain wall across the crystal. The light then passes through a photographic transparency 123 onto the face of a photoconductive device 124 which is employed to detect the modulation of the light beam by information recorded on the photographic transparency. The construction and operation of this photoconductive device will be better understood by reference to FIG. 11a in which a portion of the face of this device is shown, the numbers in FIG. 11a corresponding to the numbers in FIG. 11. The photoconductive device consists of an insulating support 124 such as ceramic or mica on which is deposited a series of parallel electrodes 125, 126, 127 and 128 in the form of a metallic electrically conducting films joined to a common bus bar 129. Each of the electrodes 125, 126 and 127 has a pair of electrodes parallel thereto and equally spaced and insulated therefrom such as electrodes 130 and 131 adjacent to electrode 125, and electrodes 132 and 133 about 126. One electrode, 134, adjacent an edge of the substrate is placed at an angle to the adjacent electrode 128, and is insulated therefrom. Each of the electrodes 130, 131, 132, 133 and 134 is connected to a common electrode 135 by load resistors 136, 137, 138, 139, 140 and 141 which can be deposited on the assembly by known microcircuitry techniques. Each of the sets of the electrodes such as 125 and electrodes 130 and 131 are covered by a thin film of photoconductor such as cadmium sulfide, shown in the figure by films 142, 143 and 144. There are thus formed pairs of elongated photocells.

Figure 11A:
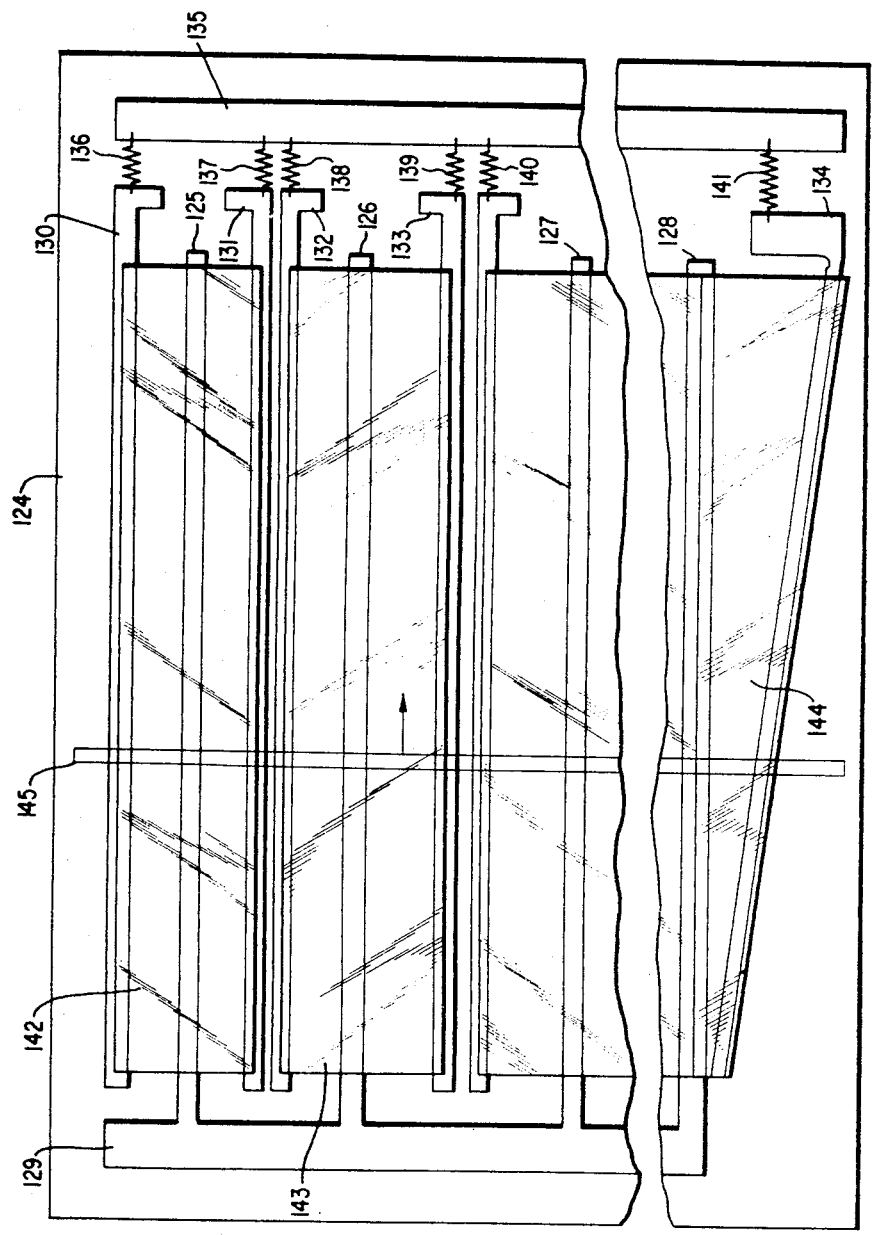
FIG. 11a illustrates a photoconductive device employed with the optical scanner of FIG. 11.

The photoconductive device is placed so that the line of light from the gadolinium molybdate scanning device falls on the face thereof perpendicular to the long axis of the elongated photocells as shown in FIG. 11a by the area 145. In operation, the bus electrode 129 is connected to a constant voltage source, and the electrode 135 is connected to the ground side of the source. Considering the cell formed by electrodes 125 and 130, current will pass through the cell in the area in which it is illuminated by the line source and a voltage will appear across resistor 136. This voltage is independent of the position of the illuminated line 145, except for minor deviations due to nonuniformity of construction. If the light is interrupted during the scan by information recorded on the photographic transparency 122 of FIG. 11, the current will decrease and the voltage across resistor 136 will decrease. Thus, the potential of electrode 130 with respect to the ground potential of electrode 135 will vary as the line scans across the photoconductive device in response to any signals recorded on the photographic transparency. Likewise, the photoconductive cells formed by electrodes 125 and 131, electrodes 126 and 132, electrodes 126 and 133 etc. will be scanned simultaneously.

The substantially triangular photoconductive cell formed by electrodes 128 and 134 is employed to monitor the progress of the slit shaped beam of light across the face of the photoconductive device. In this photocell, voltage developed across the load resistor 141 is proportional to the distance of the scanning beam from the end of the device. The resultant signal can be employed to control the uniformity of the scan: for example, by differentiating the signal and applying the output of the differentiator suitably amplified as a feed-back control voltage to the power supply 121 providing the driving voltage to the electrodes of the gadolinium molybdate crystal. The signal can also be used in coding the output signals with information as to the position of the beam. This photocell is employed in a region of the optical aperture which is not modulated by information.

As noted above, simultaneous signals are generated by each photocell of the array comprising the photoconductive device to provide a useful signal for transmission to a distant location, e.g., for readout on a cathode ray tube, one photoconductive cell can be read out at each scan of the line in any desired sequence. A reference signal from the power supply 121 of FIG. 11 can be supplied to the enclosing device 147 to switch each photoconductive cell in turn into the circuit using conventional switching means. If desired, more than one photocell can be read simultaneously and the resulting information combined, e.g., by multiplexing to shorten the time required to read out the information. In FIG. 11 the coding equipment for the output of the photoconductive device is indicated by 147 and the power supply for the photoconductor device by 146.

In view of the divergence of the beam of light emerging from the region of the domain wall it is necessary for the polarizer, transparency and detector to be in as close proximity as possible to obtain the narrowest line at the director. A higher resolution method of operation is to employ a lens system to produce an image of the line generated by the domain wall. In the following figures the focal points illustrated are not exact.

Figure 12:
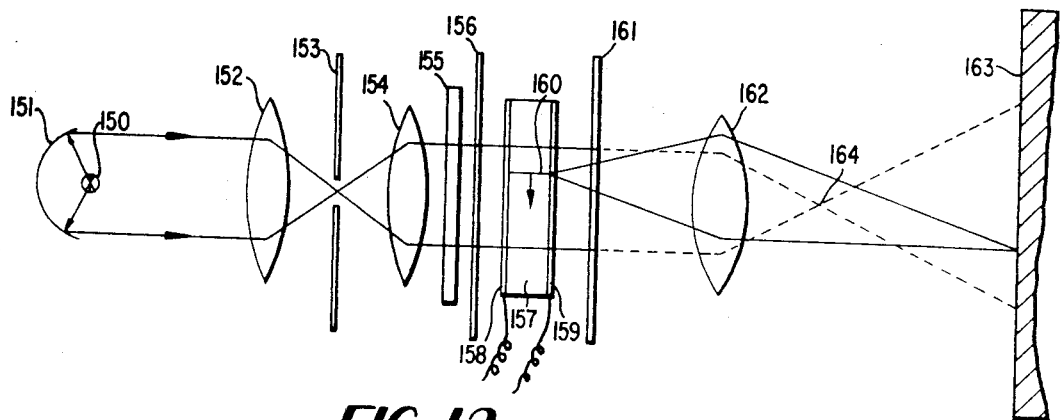
FIG. 12 is an enlarged view of the face of the photoconductive device employed in FIG. 11.

FIG. 12 illustrates the optical arrangement of a line scanner using polarization filtering to obtain a light line image on a detector which can be magnified or diminished as desired by appropriate choice of the lens system. A high intensity small area light source, such as a xenon arc, 150 is placed at the focus of a reflector 151 to produce a beam of light which is focused by lens 152 onto a plate 153 having a "pinhole" aperture stop. The light emerging from the stop is then collimated by lens 154 to an essentially parallel beam of light. A filter 155 is provided to limit the wavelength of the light employed to the desired region. The light then passes through a polarizer 156 such as Polarex KS–MIK filter and thence through a c-cut half-wave plate of gadolinium oriented to pass light with electric vector parallel to a {110} plane of crystal 157, and thence through a c-cut half-wave plate of gadolinium molybdate 157 equipped with control electrodes 158 and 159 to provide for the generation and movement of domain walls in response to electrical signals applied thereto as described hereinabove. The light emerging from the region of the domain wall indicated by the dotted line 160 passes through analyzer 161 which is oriented parallel with polarizer 156 and is focused by lens 162 onto the face of the detector 163. Movement of the domain wall across the gadolinium molybdate crystal 157 in response to control signals applied to electrodes 158 and 159 causes the line image to move across the detector 163. Light from the adjacent domains is stopped by the analyzer 161 provided the polarizer and analyzer are both set to transmit light with its electric vector directed along one of the {110} directions and the gadolinium molybdate plate is cut to give half-wave retardation. Leakage light passing the analyzer 161 is shown in the figure by dotted rays and is focused between the lens 162 and detector 163. A small opaque stop 164 placed at this focus can be employed to eliminate such leakage by spatial filtering and thus improve the contrast between the lime image and the background. In this embodiment, spatial filtering could be employed alone if desired.

If the analyzer is rotated to pass light with its electric vector perpendicular to that passed by the analyzer, a dark line image is obtained. For that purpose, a pin hole in an otherwise opaque card is optionally provided at 164.

Figure 13:
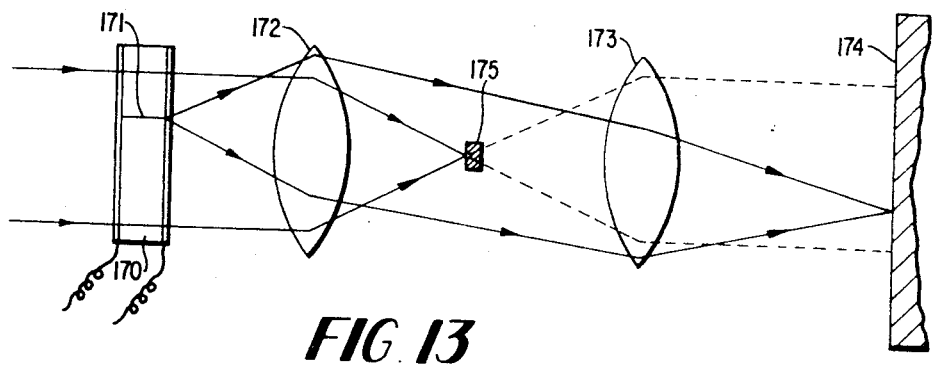
FIG. 13 illustrates apparatus which can be used to form a line scanner by spatial filtration of the light passing through a coupled ferroelectric-ferroelastic crystal plate.

FIG. 13 illustrates another optical imaging system which can be employed to advantage with spatial filtering to produce either a dark line image or a light line image. A c-cut gadolinium molybdate crystal 170 (which need not be a half-wave plate) with suitable control electrodes is illuminated with collimated light directed along the c-axis. The crystal has two domains separated by a domain wall 171. Light emerging from the region of the domain wall 171 is collimated by lens 172 and then focused by lens 173 on the detector 174. If the focal length of lens 172 is $f_1$ and that of lens 173 is $f_2$, then the two lens are placed at a distance $f_1 + f_2$ from each other. Collimated light passing through the domains passes through lens 172, is brought to a focus and then recollimated by lens 173. A small opaque stop 175 placed at the focus, between lens 172 and lens 173, blocks of the light transmitted through the domains and isolates the light scattered or deflected by the domain wall so that a light line image is obtained at the detector, which can be moved in accordance with the movement of the domain wall.

By replacing the small opaque stop 175 with a "pinhole" aperture to selectively stop the originally collimated light that is deflected from the region of the domain wall, while passing the focused light from the domains, a dark line image on a light field is obtained.

The spatial filtering technique described herein above has the advantage that for a given source a greater amount of light is transmitted, since both polarization components are employed and loss in polarizer and analyzer is avoided, which more than offset the slight losses due to the lens imperfection and the finite size of the stop required. On the other hand, imperfections of the crystal, such as scratches on the surface, which are capable of scattering light are imaged onto the detector in the same manner as the light transmitted by the domain wall. Other spatial filter configurations are possible, as will be clear to those skilled in the art.

Figure 14:
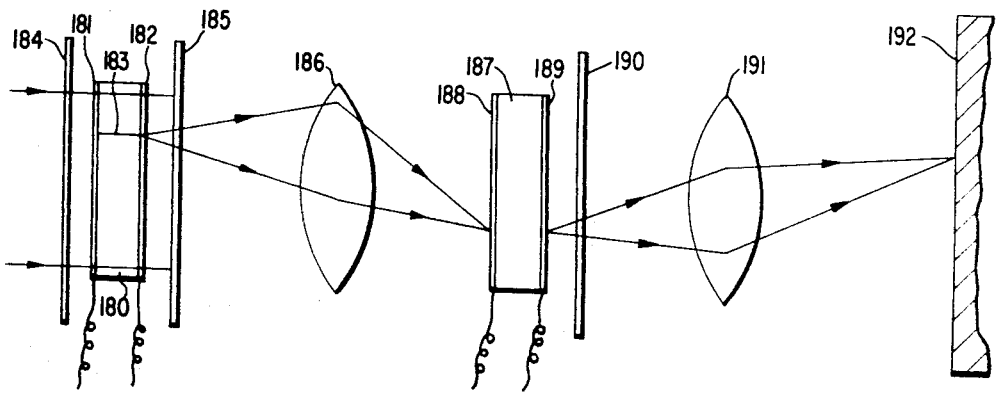
FIG. 14 illustrates the use of two coupled ferroelectric-ferroelastic crystal plates having domain walls perpendicular to each other to provide a spot scanner which can be controlled in two dimensions.

Two ferroelectric/ferroelastic crystals can be employed in sequence, and arranged so that the domain wall of the second crystal is perpendicular to the domain wall of the first crystal to provide a point optical scanner which can be controlled in two dimensions. The filtering can be arranged to provide a point of light at the detector plane, a light line image interrupted at a point or a dark cross on a light field. FIG. 14 illustrates a suitable optical arrangement.

In FIG. 14 a first c-cut gadolinium molybdate half-wave crystal plate 180 is provided with electrodes 181, 182 whereby the movement of a domain wall 183 may be controlled by appropriate control signals. In this crystal the domain wall is generated in a plane perpendicular to the drawing. Collimated light along the c-axis of the plate passes through a polarizer 184, the first gadolinium molybdate crystal plate and an analyzer 185. The analyzer and polarizer are set parallel to one of the <110> directions of the crystal so that light transmitted by the domain is blocked while light transmitted by the region of the domain wall is transmitted by the analyzer. Field lens 186 focuses the light from the region of the domain wall onto the face of a second c-cut, half-wave gadolinium molybdate crystal plate, 187, also fitted with control electrodes 188, 189 and arranged so that the domain walls are constrained to a plane parallel with the plane of the drawing. After transmission through the second gadolinium molybdate crystal, the light passes through a second analyzer 190 set to transmit light with its electric vector in the same plane as the light transmitted by polarizer 184 and analyzer 185. The light emerging from analyzer 190 is then focused by lens 191 on the detector 192. The portion of the line image of light projected onto the second gadolinium molybdate, which passes through the gadolinium molybdate domains is rotated 90° and is extinguished by analyzer 190. The portion of the line image intersecting the region of the domain wall of the second gadolinium molybdate plate is not rotated and therefore passes the analyzer. Thus a spot of light corresponding to the intersection of the domain walls is formed at the detector which can be moved in two perpendicular directions by control signals applied to the first and to the second gadolinium molybdate crystals. By rotation of analyzer 190 to transmit light with its electric vector perpendicular to that transmitted by polarizer 184 and analyzer 185 there is obtained a light line image interrupted by a dark spot corresponding to the portion of the domain wall in the second gadolinium molybdate crystal plate, 187 at its intersection with the image of the wall in plate 180. Again, if analyzer 185 is oriented to transmit light having its electric vector perpendicular to the electric vector of light transmitted by analyzer 184, and analyzer 190 is oriented to transmit light having its electric vector parallel with light transmitted by analyzer 184 there is obtained a dark cross on a light field.

In view of the precise linearity and the narrow line width of the line produced by the optical system of the present invention, the embodiments wherein a dark line is produced on a light field can be used in optical measuring instruments employed as a variable fiducial mark. For such use it is not always necessary to move the line. Thus for use as a fixed line in a microscope eyepiece, a c-cut half-wave gadolinium molybdate plate can be divided into two domains separated by a domain wall by mechanical pressure; and thereafter cemented between crossed polarizer elements, thus fixing the position of the domain wall and providing the appropriate polarization filtering to obtain the desired fiducial line.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A method of optical line scanning which comprises.
   i. forming at least one ferroelectric-ferroelastic domain wall in a crystal plate having coupled ferroelectric-ferroelastic properties, exhibiting uniaxial electric polarization, transparent to light and cut so that the domain wall is formed perpendicular to the face of said plate; whereby said plate is divided into at least two ferroelectric-ferroelastic domains;
   ii. moving the domain wall in response to control signals;
   iii. passing a beam of light through said plate, the plane of incidence of said beam being substantially the plane of the domain wall;
   iv. focusing the light emerging from said domains to a focus;
   v. separating the light passing through said domains from the light passing through the region of the domain wall by a stop at said focus; and
   vi. imaging the light passing said stop.

2. Method of claim 1 wherein said stop is a pinhole aperture.

3. Method of claim 2 wherein said plate is a half-wave plate, and said beam of light is polarized light, the electric vector of the incident light lying in the plane of the domain wall or perpendicular thereto, which additionally comprises passing the light emerging from said plate through an analyzer set to transmit light having its electric vector perpendicular to the electric vector of the said incident light.

4. Method of claim 1 wherein said stop is an opaque stop having an area sufficient to extinguish light passing through said domains of said plate.

5. Method of claim 4 wherein said plate is a half-wave plate and said beam of light is polarized light, the electric vector of the incident light lying in the plane of the domain wall or perpendicular thereto, which additionally comprises passing the light emerging from said plate through an analyzer set to transmit light having its electric vector in the same plane as the electric vector of the said incident light.

6. The method of claim 1 wherein said crystal plate is a crystal having an Aizu point group representation $\bar{4}2mFmm2, \bar{4}F2,$ or $222F2$.

7. The method of claim 6 wherein the Aizu point group representation is $\bar{4}2mFmm2$.

8. The method of claim 7 where said crystal has the $\beta'$-gadolinium molybdate structure and has the formula
   $(R_xR'_{1-x})_2O_3 \cdot 3(Mo_{1-e}W_eO_3)$
   wherein R and R' are scandium, yttrium or at least one rare earth element having an atomic number from 57 to 71, x is from 1 to 1.0 and e is from 0 to 0.2, and said plate is a c-cut plate having edges parallel to the {110} planes.

9. The method of claim 8 wherein said crystal has the formula $\beta'$-DyGd(MoO$_4$)$_3$, $\beta'$-Nd$_{0.1}$Tb$_{1.9}$(MoO$_4$)$_3$, $\beta'$-Gd$_2$(Mo$_{0.9}$W$_{0.1}$O$_4$)$_3$ and those crystals represented by the formula $\beta'$-X$_2$(MoO$_4$)$_3$, wherein X is Sm, Eu, Gd or Tb.

10. The method of claim 9 wherein said stop is a pinhole aperture.

11. The method of claim 10 wherein said plate is a half-wave plate, and said beam of light is polarized light, the electric vector of the incident light lying in the plane of the domain wall or perpendicular thereto, which additionally comprises passing the light emerging from said plate through an analyzer set to transmit light having its electric vector perpendicular to the electric vector of the said incident light.

12. The method of claim 9 wherein said stop is an opaque stop having an area sufficient to extinguish light passing through said domains of said plate.

13. The method of claim 12 wherein said plate is a half-wave plate and said beam of light is polarized light, the electric vector of the incident light lying in the plane of the domain wall or perpendicular thereto, which additionally comprises passing the light emerging from said plate through an analyzer set to transmit light having its electric vector in the same plane as the electric vector of the said incident light.

14. The method of claim 9 wherein said crystal is $\beta'$-gadolinium molybdate.

15. The method of claim 14 wherein said stop is a pinhole aperture.

16. The method of claim 15 wherein said plate is a half-wave plate, and said beam of light is polarized light, the electric rector of the incident light lying in the plane of the domain wall or perpendicular thereto, which additionally comprises passing the light emerging from said plate through an analyzer set to transmit light having its electric vector perpendicular to the electric vector of the said incident light.

17. The method of claim claim 14 wherein said stop is an opaque stop having an area sufficient to extinguish light passing through said domains of said plate.

18. The method of claim 17 wherein said plate is a half-wave plate and said beam of light is polarized light, the electric vector of the incident light lying in the plane of the domain wall or perpendicular thereto, which additionally comprises passing the light emerging from said plate through an analyzer set to transmit light having its electric vector in the same plane as the electric vector of the said incident light.

19. An optical line scanner comprising a coupled ferroelectric-ferroelastic crystal plate exhibiting uniaxial electric polarization along a ferroelectric axis having its faces cut perpendicular to crystal planes containing said ferroelectric axis along which domain walls are allowed, and its edges cut substantially parallel to said planes; electrode means on the faces of said plate to nucleate and move domain walls in said plate in response to control signals, said plate and said electrode means being transparent to light whereby said plate is divided into at least two ferroelectric-ferroelastic domains by said domain walls;
  means to direct a beam of light on said crystal plate;
  means to focus light transmitted by said domains of said plate;
  a stop at said focus to separate light transmitted by said domains of said plate from the light transmitted by said domain walls; and
  means to image the light passing said stop.

20. Apparatus of claim 19 wherein said stop is a pinhole aperture.

21. Apparatus of claim 20 wherein said plate is a half-wave plate and additionally comprising means to polarize the light incident on said plate whereby the electric vector of said light is parallel to said domain walls or perpendicular thereto, and analyzer means in the path of light transmitted by said crystal plate oriented to transmit light having its electric vector perpendicular to the electric vector of the incident light.

22. Apparatus of claim 19 wherein said stop is an opaque stop having an area sufficient to extinguish light transmitted by said domains of said plate.

23. Apparatus of claim 22 wherein said plate is a half-wave plate additionally comprising means to polarize the light incident on said plate whereby the electric vector of said light is parallel to said domain walls or perpendicular thereto and analyzer means in the path of light transmitted by said crystal plate oriented to transmit light having its electric vector in the same plane as the electric vector of the incident light.

24. Apparatus of claim 19 wherein said crystal plate is a crystal having an Aizu point group representations $\overline{4}2mFmm2$, $\overline{4}F2$, or $222F2$.

25. Apparatus of claim 24 wherein the Aizu point group representation is $\overline{4}2mFmm2$.

26. Apparatus of claim 25 where said crystal has the $\beta'$-gadolinium molybdate structure and has the formula
  $(R_xR'_{1-x})_2O_3 \cdot 3(Mo_{1-e}W_eO_3)$
wherein R and R' are scandium, yttrium or at least one rare earth element having an atomic number from 57 to 71, $x$ is from 0 to 1.0 and $e$ is from 0 to 0.2, and said plate is a c-cut plate having edges parallel to the $\{110\}$ planes.

27. Apparatus of claim 26 wherein said crystal has the formula $\beta'$-$DyGd(MoO_4)_3$, $\beta'$-$Nd_{0.1}Tb_{1.9}(MoO_4)_3$, $\beta'Gd_{20.9}W_{0.1}O_4)_3$ and those crystals represented by the formula $\beta'$-$X_2(MoO_4)_3$, wherein X is Sm, Eu, Gd or Tb.

28. Apparatus of claim 27 wherein said stop is a pinhole aperture.

29. apparatus of claim 28 wherein said plate is a half-wave plate and additionally comprising means to polarize the light incident on said plate whereby the electric vector of said light is parallel to said domain walls or perpendicular thereto, and analyzer means in the path of light transmitted by said crystal plate oriented to transmit light having its electric vector perpendicular to the electric vector of the incident light.

30. Apparatus of claim 27 wherein said stop is an opaque stop having an area sufficient to extinguish light transmitted by said domains of said plate.

31. Apparatus of claim 30 wherein said plate is a half-wave plate additionally comprising means to polarize the light incident on said plate whereby the electric vector of said light is parallel to said domain walls or perpendicular thereto and analyzer means in the path of light transmitted by said crystal plate oriented to transmit light having its electric vector in the same plane as the electric vector of the incident light.

32. Apparatus of claim 27 wherein said crystal is $\beta'$-gadolinium molybdate.

33. Apparatus of claim 32 wherein said stop is a pinhole aperture.

34. Apparatus of claim 33 wherein said plate is a half-wave plate and additionally comprising means to polarize the light incident on said plate whereby the electric vector of said light is parallel to said domain walls or perpendicular thereto, and analyzer means in the path of light transmitted by said crystal plate oriented to transmit light having its electric vector perpendicular to the electric vector of the incident light.

35. Apparatus of claim 32 wherein said stop is an opaque stop having an area sufficient to extinguish light transmitted by said domains of said plate.

36. Apparatus of claim 35 wherein said plate is a half-wave plate additionally comprising means to polarize the light incident on said plate whereby the electric vector of said light is parallel to said domain walls or perpendicular thereto and analyzer means in the path of light transmitted by said crystal plate oriented to transmit light having its electric vector in the same plane as the electric vector of the incident light.

* * * * *